(12) United States Patent
Wang

(10) Patent No.: US 10,268,287 B2
(45) Date of Patent: *Apr. 23, 2019

(54) KEYSTROKE TYPE MOUSE WITH DIGITAL AND ANALOG SIGNAL OUTPUTS

(71) Applicants: DEXIN ELECTRONIC LTD., Donggaun Guangdong (CN); DEXIN CORPORATION, New Taipei (TW)

(72) Inventor: Ting-Sheng Wang, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 246 days.

This patent is subject to a terminal disclaimer.

(21) Appl. No.: 15/366,032

(22) Filed: Dec. 1, 2016

(65) Prior Publication Data

US 2018/0157345 A1    Jun. 7, 2018

(51) Int. Cl.
| | |
|---|---|
| *G06F 3/033* | (2013.01) |
| *G06F 3/038* | (2013.01) |
| *G06F 3/0354* | (2013.01) |
| *A63F 13/24* | (2014.01) |

(52) U.S. Cl.
CPC ............ *G06F 3/0383* (2013.01); *A63F 13/24* (2014.09); *G06F 3/03543* (2013.01)

(58) Field of Classification Search
CPC ........ A63F 13/24; G06F 3/02; G06F 3/03543; G06F 3/0383
See application file for complete search history.

(56) References Cited

U.S. PATENT DOCUMENTS

| | | | |
|---|---|---|---|
| 2003/0222851 A1* | 12/2003 | Lai | G06F 3/03543 345/163 |
| 2011/0095983 A1* | 4/2011 | Lu | G06F 3/03543 345/166 |

* cited by examiner

*Primary Examiner* — Nelson M Rosario
*Assistant Examiner* — Andrew Lee
(74) *Attorney, Agent, or Firm* — Li & Cai Intellectual Property (USA) Office

(57) ABSTRACT

A keystroke type mouse with digital and analog signal outputs, comprises a mouse body, circuit board, switch module, button module, elastic element, magnetic sensor and magnetic element. The circuit board is disposed on the mouse body, the switch module is disposed on the circuit board, the button module is disposed on the mouse body. The elastic element is disposed between the circuit board and mouse body so the circuit board is movable. The magnetic sensor and the magnetic element are disposed on the circuit board and the mouse body respectively. The mouse outputs a digital signal when the button module is clicked by a force lower than a preset value; and the mouse outputs an analog signal when the button module is clicked by a force higher than the preset value that moves the circuit board downward and changes the space between the magnetic sensor and the magnetic element.

9 Claims, 6 Drawing Sheets

KEYSTROKE TYPE MOUSE WITH DIGITAL AND ANALOG SIGNAL OUTPUTS

BACKGROUND OF THE INVENTION

1. Field of the Invention

The present invention relates to a keystroke mouse; in particular, to a keystroke mouse with digital and analog signal outputs.

2. Description of Related Art

A keyboard and mouse are the most common input devices for conventional computers. Conventional mouse devices have at least a left button, a right button, and a scroll between the two buttons. There are many popular computer games available in the market. There are also many game players streaming their gameplay on the internet. Some of the players are so skillful that they turn playing games into a profession. That is, they are professional game players. During a gameplay, the mouse may be clicked for at least hundreds, if not thousands, times. Conventional mouse devices only output a digital signal. Therefore, it is not possible to accomplish delicate controls with conventional mouse devices.

In this regard, the applicant of the present invention provides a solution to address the aforementioned limitation.

SUMMARY OF THE INVENTION

The object of the present invention is to provide a keystroke mouse with digital and analog signal outputs, thus the mouse is suitable for games requiring delicate controls.

In order to achieve the aforementioned objects, according to an embodiment of the present invention, a keystroke type mouse with digital and analog signal outputs comprises a mouse body with an accommodating space; a circuit board disposed within the accommodating space; a switch module disposed on the circuit board and electrically connected with the circuit board; a button module disposed on the mouse body, the button module being vertically movable and comprising a trigger, the trigger activating the switch module when the button module is clicked; an elastic element disposed between the mouse body and the circuit board so the circuit board and the switch module are movable in the accommodating space of the mouse body; a magnetic sensor electrically connected with the circuit board and disposed on either the circuit board or the mouse body; and a magnetic element disposed on either the circuit board or the mouse body opposite to the magnetic sensor; wherein the mouse outputs a digital signal when the button module is clicked by a force lower than a preset value; and the mouse outputs an analog signal when the button module is clicked by a force higher than the preset value that moves the circuit board and the switch module downward and changes the relative position between the magnetic sensor and the magnetic element.

In order to achieve the aforementioned objects, according to another embodiment of the present invention, a keystroke type mouse with digital and analog signal outputs, comprises a mouse body with an accommodating space; a circuit board disposed within the accommodating space; a switch module disposed on the circuit board and electrically connected with the circuit board; a button module disposed on the mouse body, the button module being vertically movable and comprising a trigger, the trigger activating the switch module when the button module is clicked; an elastic element disposed between the mouse body and the circuit board so the circuit board and the switch module are movable in the accommodating space of the mouse body; a magnetic sensor electrically connected with the circuit board and disposed on either the circuit board or the mouse body; a magnetic element disposed on either the circuit board or the mouse body opposite to the magnetic sensor; and a control unit electrically connected with the circuit board; wherein the mouse outputs a digital signal when the button module is clicked by a force lower than a preset value; and the mouse outputs an analog signal when the button module is clicked by a force higher than the preset value that moves the circuit board and the switch module downward and changes the relative position between the magnetic sensor and the magnetic element; wherein the control unit switches between a first output mode that outputs both a digital signal and analog signal, or a second output mode that outputs only a digital signal.

In order to achieve the aforementioned objects, according to yet another embodiment, a keystroke type mouse with digital and analog signal outputs, comprises a mouse body with an accommodating space; a circuit board disposed within the accommodating space; a switch module disposed on the circuit board and electrically connected with the circuit board; a button module disposed on the mouse body, the button module being vertically movable and comprising a trigger, the trigger activating the switch module when the button module is clicked; an elastic element disposed between the mouse body and the circuit board so the circuit board and the switch module are movable in the accommodating space of the mouse body; a magnetic sensor electrically connected with the circuit board and disposed on either the circuit board or the mouse body; a magnetic element disposed on either the circuit board or the mouse body opposite to the magnetic sensor; and a microprocessor electrically connected with the circuit board; wherein the mouse outputs a digital signal when the button module is clicked by a force lower than a preset value; and the mouse outputs an analog signal when the button module is clicked by a force higher than the preset value that moves the circuit board and the switch module downward and changes the relative position between the magnetic sensor and the magnetic element; wherein the microprocessor switches between a first output mode that outputs both a digital signal and analog signal, or a second output mode that outputs only a digital signal.

The present invention has at least the following advantages:

In the present invention, the switch module is disposed on the circuit board, the circuit board and the switch module are movably disposed on the mouse body, and the magnetic sensor and the magnetic element are disposed on the mouse body and circuit board respectively. In this regard, the output of digital and analog signals can be controlled by the clicking force applied upon the button module, thus the mouse is suitable for games requiring delicate controls.

The present invention can further comprise a control unit that is electrically connected with the circuit board. The control unit switches between a first output mode that outputs both a digital signal and analog signal, or a second output mode that outputs only a digital signal. Therefore, the user can disable the analog output in case the analog signal is not required.

The present invention can further comprise a microprocessor that is electrically connected with the circuit board. The switch between a first output mode that outputs both a digital signal and analog signal, or a second output mode that outputs a digital signal can be controlled via the microprocessor. Therefore, the user can disable the analog output in case the analog signal is not required.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

First Embodiment

Figure 1:
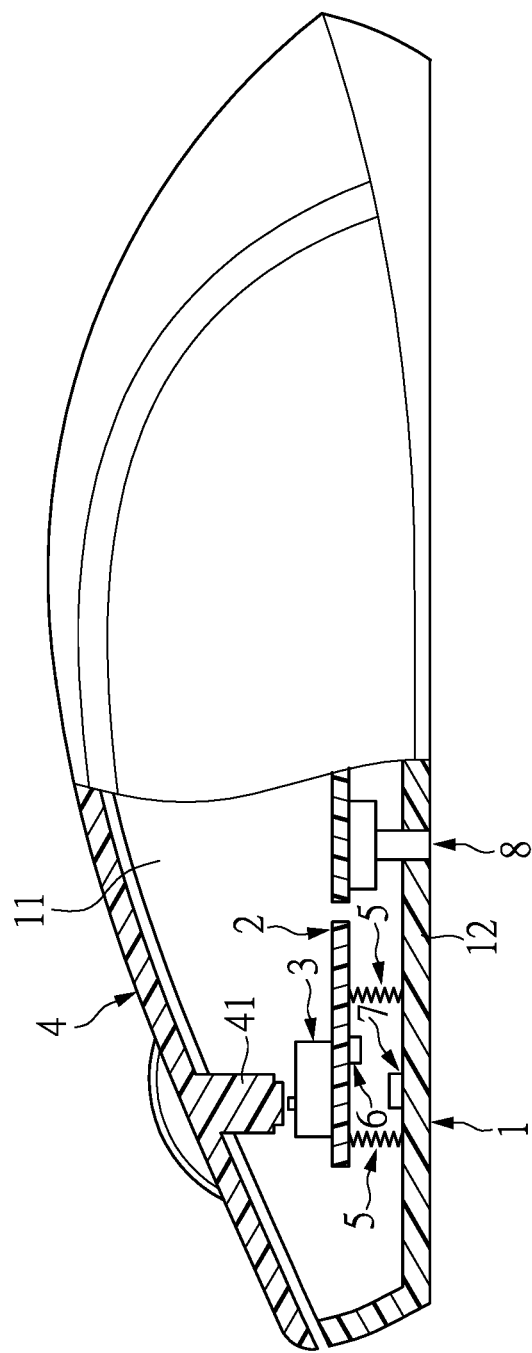
FIG. 1 shows a plan view of a keystroke mouse according to a first embodiment of the present invention.
Figure 2:
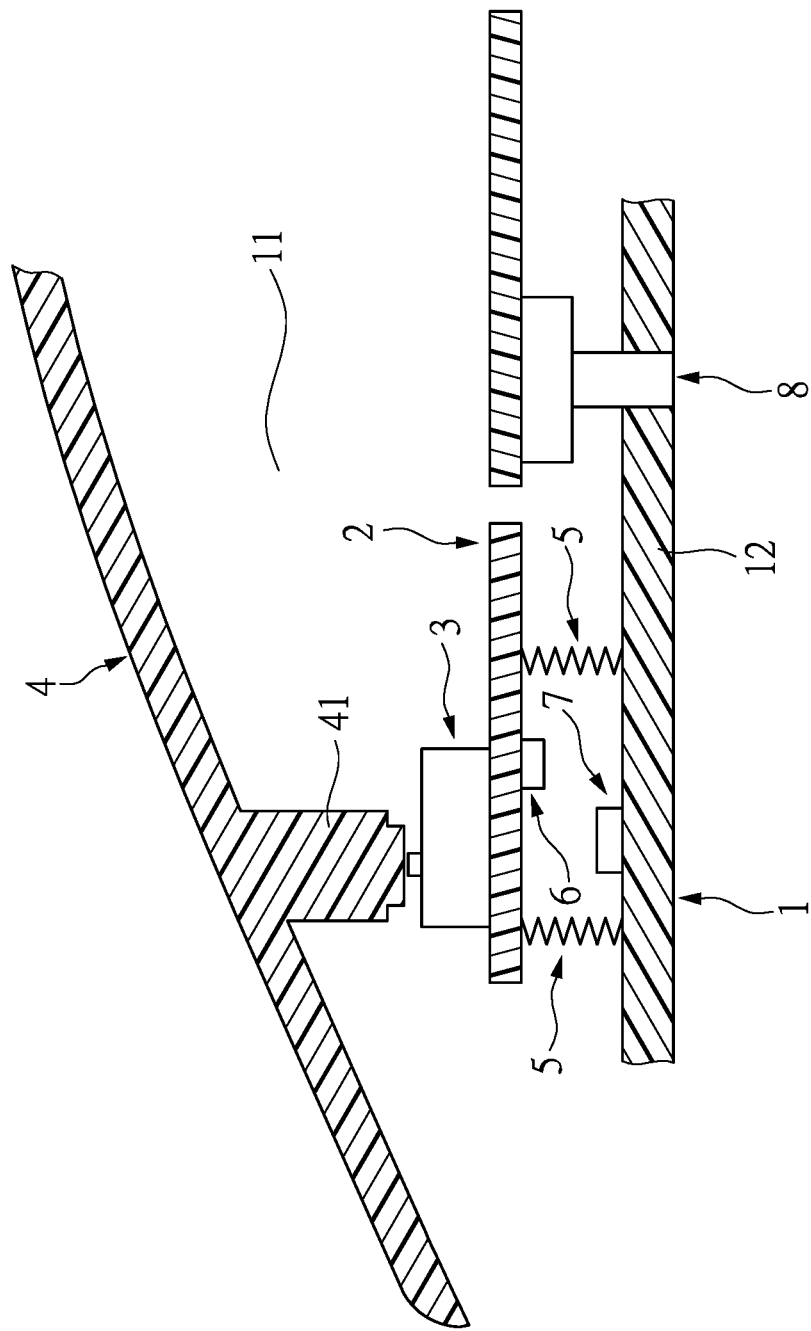
FIG. 2 shows a plan view of the local structure of a keystroke mouse according to an embodiment of the present invention.

Refer to FIG. 1 and FIG. 2. A keystroke type mouse with digital and analog signal outputs in the present invention comprises a mouse body 1, an circuit board 2, a switch module 3, a button module 4, an elastic element 5, a magnetic sensor 6 and a magnetic element 7.

The mouse body 1 has an accommodating space 11 that houses the circuit board 2 and the switch module 3. The circuit board 2 can be, but is not limited to, a circuit substrate independent from the circuit substrate of the mouse. The switch module 3 is disposed on the circuit board 2 and electrically connected therewith. The accommodating space 11 is the space within the mouse body 1, which also houses the components known in conventional mouse devices that are not described in the present embodiment, such as but not limited to an optical module and scroll wheel.

A button module 4 is disposed on the mouse body 1, and the button module 4 is vertically movable. A trigger 41 is disposed at the medial side of the button module 4 and above to the switch module 3. The trigger 41 activates the switch module 3 by clicking the button module 4. The switch module 3 generates a digital signal in response to a click cycle from a user. Conventionally, the button module 4 has a left button and a right button, thus the circuit board 2, switch module 3, elastic element 5, magnetic sensor 6 and magnetic element 7 all have two units in correspondence. However, the present invention does not intend to limit the number of the circuit board 2, switch module 3, button module 4, elastic element 5, magnetic sensor 6 and magnetic element 7.

The elastic element 5 can be, but not limited to, a conical spring or a blade spring. The elastic element 5 in the present embodiment is a conical spring. There is at least one elastic element 5, preferably two, and there can be even more, such as three, four or five elastic elements 5. The elastic element 5 is disposed between the mouse body 1 and the circuit board 2. That is, the bilateral ends of the elastic element 5 contact with the bottom 12 of the mouse body 1 and the bottom surface of the circuit board 2 respectively. Therefore, the circuit board 2 and the switch module 3 are movable within the accommodating space 11 of the mouse body 1. Preferably, the position of elastic element 5 makes the circuit board 2 horizontally level in the accommodating space 11 of the mouse body 1, and stabilizes the circuit board 2 and the switch module 3 when they move upward and downward. When the button module 4 is pressed by a force higher than a preset value, the circuit board 2 and the switch module 3 move downward. When the pressing force is released, the circuit board 2 and the switch module 3 are returned to their original position by the elastic element 5. However, the present invention does not intend to limit the motion of the circuit board 2 to horizontally upward-downward. For example, the circuit board 2 can incline downward and upward as well.

The magnetic sensor 6 can be a Hall effect sensor. The magnetic sensor 6 is electrically connected with the circuit board 2. The magnetic sensor 6 can be disposed on either the circuit board 2 or the mouse body 1. In the present embodiment, the magnetic sensor 6 is disposed on the circuit board 2, specifically on the bottom surface of the circuit board 2. Therefore, the magnetic sensor 6 moves along with the circuit board 2.

The magnetic element 7 can be a magnet. The magnetic element 7 is disposed on either the circuit board 2 or the mouse body 1 opposite to the magnetic sensor. That is, if the magnetic sensor 6 is disposed on the circuit board 2, then the magnetic element 7 is disposed on the mouse body 1, and vice versa. The magnetic element 7 can be attached directly to the circuit board 2 or the mouse body 1, or connected to the circuit board 2 or the mouse body 1 by a holder or other connecting means. In the present embodiment, the magnetic element 7 is disposed on the bottom 12 of the mouse body 1. Therefore, the magnetic element 7 is stationary.

The interval between the magnetic sensor 6 and the magnetic element 7 changes as the circuit board 2 moves upward and downward. The magnetic sensor 6 detects the change of the interval between the magnetic sensor 6 and the magnetic element 7, and outputs an analog signal. Preferably, the magnetic sensor 6 and the magnetic element 7 are vertically staggered so the two will not collide as the circuit board 2 moves upward and downward.

The switch module 3 is disposed on the circuit board 2, thus the switch module 3 and the circuit board 2 are movable in the mouse body 1. In addition, the magnetic sensor 6 and the magnetic element 7 are disposed on the circuit board 2 and the mouse body 1 respectively. Therefore, the output of digital and analog signals can be controlled by the clicking force applied upon the button module 4. Therefore, the mouse is suitable for games requiring delicate controls.

Figure 3:
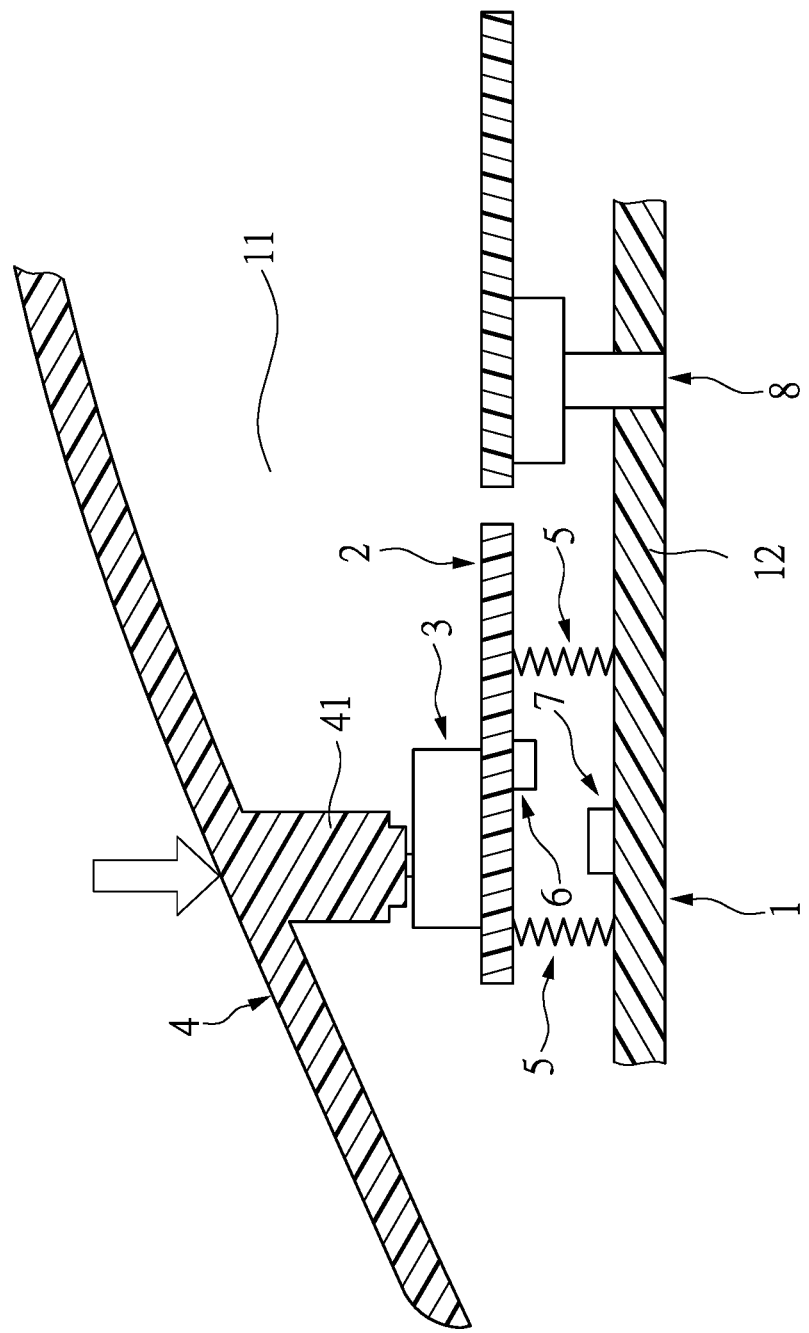
FIG. 3 shows a motion diagram of a keystroke mouse according to an embodiment of the present invention (1)
Figure 4:
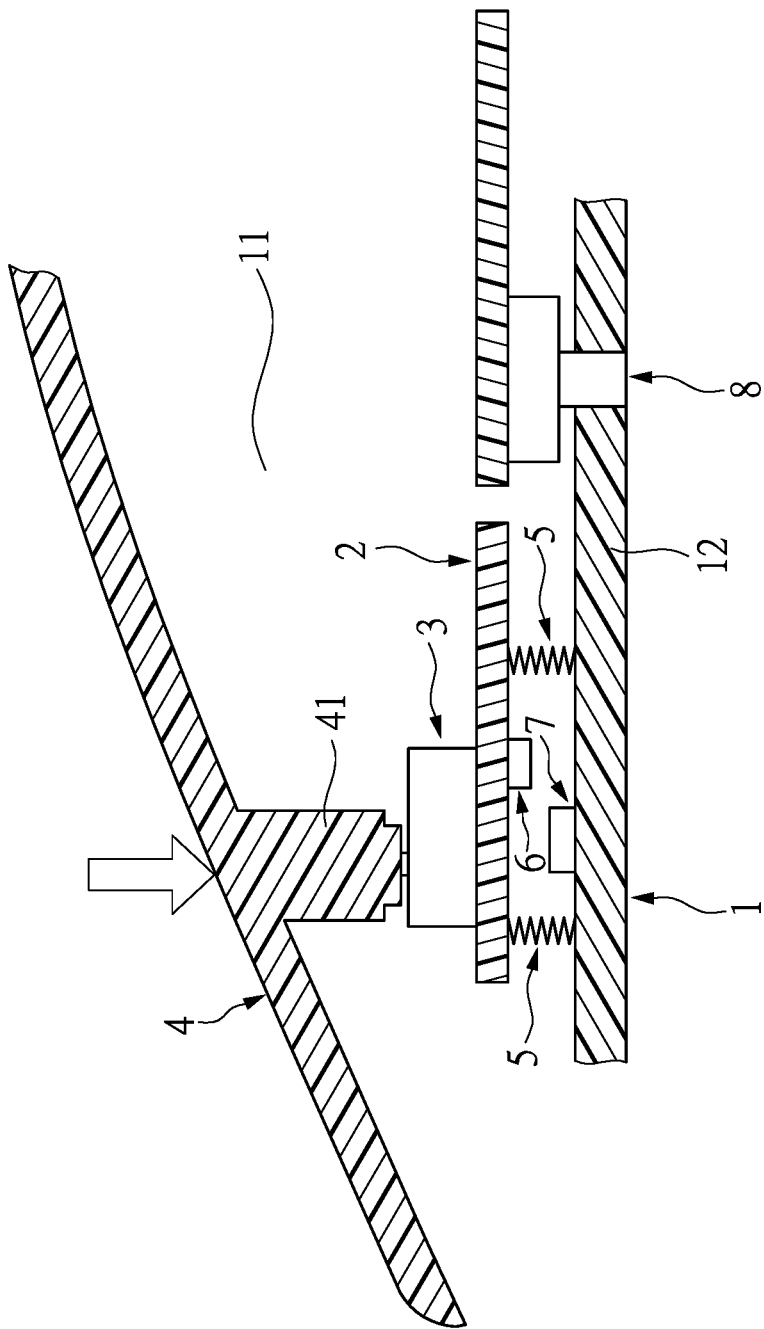
FIG. 4 shows a motion diagram of a keystroke mouse according to an embodiment of the present invention (2)

Referring to FIG. 3, the mouse outputs a digital signal when the button module 4 is clicked by a force lower than a preset value (e.g., 90 g). Referring to FIG. 4, the mouse outputs an analog signal when the button module 4 is clicked by a force higher than the preset value such that it moves the circuit board 2 and the switch module 3 downward and changes the relative position between the magnetic sensor 6 and the magnetic element 7. The preset value can be modified based on the application. For example, the preset value can range from 70 g to 100 g. The present invention does not intend to limit the preset value.

The magnetic sensor 6 and the magnetic element 7 achieves a stepless pressure sensing similar to an L2/R2 button in a gamepad by the magnetic induction mechanism. The mouse switches between digital and analog signal output automatically according to the clicking force from a user.

The keystroke mouse in the present invention offers pressure sensing, thus the mouse is suitable for games requiring delicate controls. The digital signal determines the type of movement, and the analog signal simulates the level of exertion. Therefore the combination of digital and analog signal achieves a precise movement simulation, such as throwing, punch, kicking, running, jumping, rolling.

The accommodating space 11 of the mouse body 1 can further houses a control unit 8 that is electrically connected with the circuit board 2. The control unit 8 can be a kill switch. The mouse body 1 can partially expose the control unit 8 for easy access. For example, the bottom 12 of the mouse body 1 partially exposes the control unit 8. The control unit 8 switches between a first output mode that outputs both a digital signal and analog signal, or a second output mode that outputs only a digital signal. Therefore, the user can disable the analog output in case the analog signal is not required.

Second Embodiment

Figure 5:
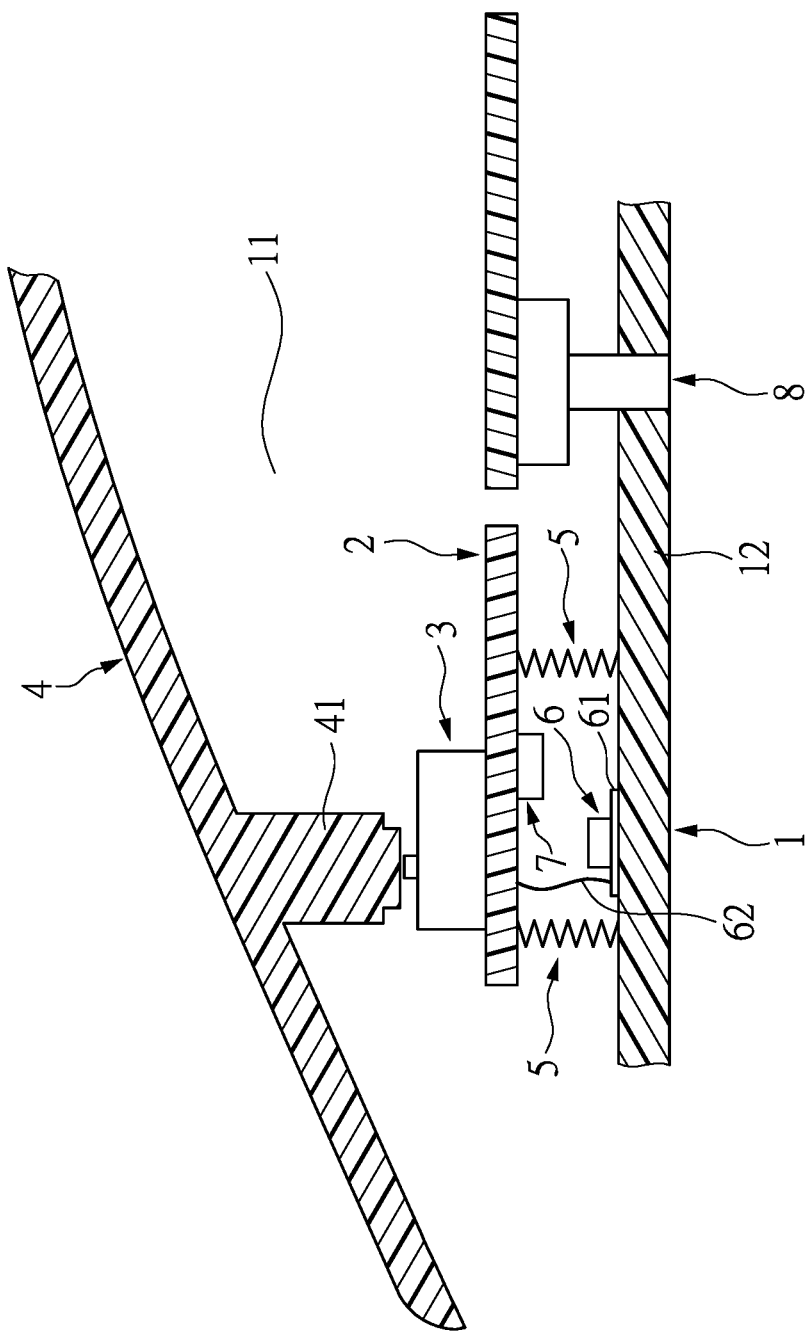
FIG. 5 shows a plan view of the local structure of a keystroke mouse according to a second embodiment of the present invention.

Referring to FIG. 5, in the present embodiment, the magnetic sensor 6 can be a Hall effect sensor. The magnetic effect sensor 6 is disposed on the mouse body 1. For example, the magnetic sensor 6 is disposed on the bottom 12 of the mouse body 1. The magnetic sensor 6 is disposed on a sub circuit board 61 and electrically connected therewith, the magnetic sensor 6 and the sub circuit board 61 are disposed on the mouse body 1. Therefore the magnetic sensor 6 and the circuit board 2 are electrically connected via the sub circuit board 61 and a connecting cable 62. In the present embodiment, the magnetic sensor 6 is disposed on the mouse body 1 so it is stationary.

The magnetic element 7 can be a magnet. The magnetic element 7 is disposed on the bottom surface of the circuit board 2. In the present embodiment, the magnetic element 7 is disposed on the circuit board 2, specifically on the bottom surface of the circuit board 2. Therefore, the magnetic element 7 moves along with the circuit board 2.

In the present embodiment, the mouse outputs a digital signal when the button module 4 is clicked by a force lower than a preset value. On the other hand, the mouse outputs an analog signal when the button module 4 is clicked by a force higher than the preset value that moves the circuit board 2 and the switch module 3 downward and changes the relative position between the magnetic sensor 6 and the magnetic element 7.

Third Embodiment

Figure 6:
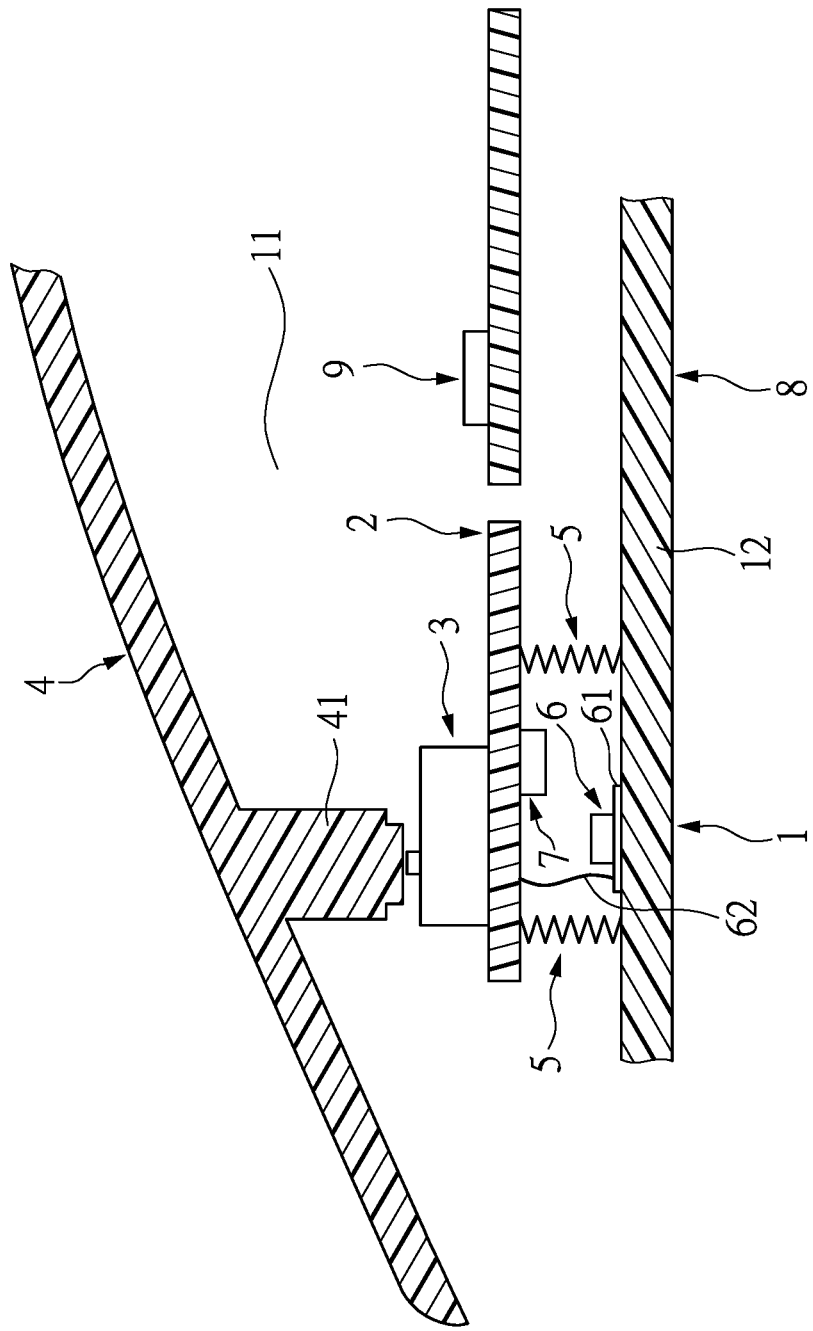
FIG. 6 shows a plan view of the local structure of a keystroke mouse according to a third embodiment of the present invention.

Referring to FIG. 6, in the present embodiment, the circuit board 2 is electrically connected with a microprocessor 9. The switch between a first output mode that outputs both a digital signal and analog signal, or a second output mode that outputs a digital signal can be controlled via the microprocessor 9 by software. Therefore, the user can disable the analog output in case the analog signal is not required.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A keystroke type mouse with digital and analog signal outputs, comprising:
   a mouse body with an accommodating space;
   a circuit board disposed within the accommodating space;
   a switch module disposed on the circuit board and electrically connected with the circuit board;
   a button module disposed on the mouse body, the button module being vertically movable and comprising a trigger, the trigger activating the switch module when the button module is clicked;
   an elastic element disposed between the mouse body and the circuit board so the circuit board and the switch module are movable in the accommodating space of the mouse body;
   a magnetic sensor electrically connected with the circuit board and disposed on either the circuit board or the mouse body; and
   a magnetic element disposed on either the circuit board or the mouse body opposite to the magnetic sensor;
   wherein the mouse outputs a digital signal when the button module is clicked by a force lower than a preset value; and the mouse outputs an analog signal when the button module is clicked by a force higher than the preset value that moves the circuit board and the switch module downward and changes the relative position between the magnetic sensor and the magnetic element.

2. The keystroke type mouse with digital and analog signal outputs according to claim 1, wherein the magnetic sensor is a Hall effect sensor and the magnetic element is a magnet, the magnetic sensor and the magnetic element are disposed with an interval.

3. The keystroke type mouse with digital and analog signal outputs according to claim 2, wherein the magnetic sensor and the magnetic element are vertically staggered.

4. The keystroke type mouse with digital and analog signal outputs according to claim 1, wherein the magnetic sensor is disposed on a bottom surface of the circuit board, and the magnetic element is disposed on a bottom of the mouse body.

5. The keystroke type mouse with digital and analog signal outputs according to claim 1, wherein the magnetic sensor is disposed on a sub circuit board and electrically connected therewith, the magnetic sensor and the sub circuit board are disposed on the mouse body, the magnetic sensor and the circuit board are electrically connected via the sub circuit board and a connecting cable, and the magnetic element is disposed on the bottom of the circuit board.

6. The keystroke type mouse with digital and analog signal outputs according to claim 1, wherein the preset value ranges from 70 g to 110 g.

7. The keystroke type mouse with digital and analog signal outputs according to claim 1, wherein the elastic element has at least two units, the bilateral ends of each of the at least two units contact with the bottom of the mouse body and the bottom surface of the circuit board respectively.

8. A keystroke type mouse with digital and analog signal outputs, comprising:
- a mouse body with an accommodating space;
- a circuit board disposed within the accommodating space;
- a switch module disposed on the circuit board and electrically connected with the circuit board;
- a button module disposed on the mouse body, the button module being vertically movable and comprising a trigger, the trigger activating the switch module when the button module is clicked;
- an elastic element disposed between the mouse body and the circuit board so the circuit board and the switch module are movable in the accommodating space of the mouse body;
- a magnetic sensor electrically connected with the circuit board and disposed on either the circuit board or the mouse body;
- a magnetic element disposed on either the circuit board or the mouse body opposite to the magnetic sensor; and
- a control unit electrically connected with the circuit board;
- wherein the mouse outputs a digital signal when the button module is clicked by a force lower than a preset value; and the mouse outputs an analog signal when the button module is clicked by a force higher than the preset value that moves the circuit board and the switch module downward and changes the relative position between the magnetic sensor and the magnetic element;
- wherein the control unit switches between a first output mode that outputs both a digital signal and analog signal, or a second output mode that outputs only a digital signal.

9. The keystroke type mouse with digital and analog signal outputs according to claim 8, wherein the control unit is a kill switch.

* * * * *